United States Patent
Klim et al.

(10) Patent No.: US 12,287,016 B2
(45) Date of Patent: Apr. 29, 2025

(54) BRAKE ASSEMBLY WITH CONTAINED BRAKE ENVIRONMENT

(71) Applicants: SAFRAN LANDING SYSTEMS, Vélizy-Villacoublay (FR); SAFRAN LANDING SYSTEMS CANADA INC., Ajax (CA)

(72) Inventors: Graeme Peter Arthur Klim, Vélizy-Villacoublay (FR); Justin Guang Yuang Cheng, Waterloo (CA); Leszek Marian Dacko, Toronto (CA); Andrew Michael Ellis, Guelph (CA)

(73) Assignees: SAFRAN LANDING SYSTEMS, Vélizy-Villacoublay (FR); SAFRAN LANDING SYSTEMS CANADA INC., Ajax (CA)

( * ) Notice: Subject to any disclaimer, the term of this patent is extended or adjusted under 35 U.S.C. 154(b) by 973 days.

(21) Appl. No.: 17/156,036

(22) Filed: Jan. 22, 2021

(65) Prior Publication Data
US 2022/0234727 A1    Jul. 28, 2022

(51) Int. Cl.
*F16D 65/00* (2006.01)
*F16D 65/847* (2006.01)
*F16D 66/00* (2006.01)

(52) U.S. Cl.
CPC ....... *F16D 65/0031* (2013.01); *F16D 65/847* (2013.01); *F16D 2066/001* (2013.01)

(58) Field of Classification Search
CPC ...... B60T 8/1703; B60T 8/325; B60T 13/746; B60T 17/22; B64C 25/42; F16D 55/40; F16D 65/0031; F16D 65/847; F16D 2066/001

See application file for complete search history.

(56) References Cited

U.S. PATENT DOCUMENTS

| 2,352,385 | A | | 6/1944 | Hollerith |
| 2,823,770 | A | * | 2/1958 | Helvern ............... F16D 65/853 188/152 |
| 2,968,368 | A | * | 1/1961 | Isbell .................. F16D 55/40 188/71.6 |

(Continued)

FOREIGN PATENT DOCUMENTS

| DE | 102012016835 B4 | 4/2019 |
| EP | 1776170 A2 | 4/2007 |

(Continued)

OTHER PUBLICATIONS

International Search Report and Written Opinion mailed Apr. 25, 2022, issued in corresponding International Application No. PCT/CA2022/050088, filed Jan. 21, 2022, 10 pages.

*Primary Examiner* — Robert A. Siconolfi
*Assistant Examiner* — Mahbubur Rashid
(74) *Attorney, Agent, or Firm* — CHRISTENSEN O'CONNOR JOHNSON KINDNESS PLLC

(57) ABSTRACT

A brake assembly is configured for use with a wheel in an ambient environment. The wheel includes a rim rotatably mounted to an axle. The brake assembly includes a brake stack and an actuation assembly configured to selectively apply a force to the brake stack. A cover sealingly engaged the rim to at least partially define a fluidic barrier between a brake cavity and the ambient environment. The brake stack is located within the brake cavity.

15 Claims, 6 Drawing Sheets

(56) References Cited

U.S. PATENT DOCUMENTS

| | | | | |
|---|---|---|---|---|
| 2,981,376 | A * | 4/1961 | Zeidler | F16D 65/128 |
| | | | | 188/71.6 |
| 3,072,220 | A | 1/1963 | Bernson et al. | |
| 3,217,844 | A * | 11/1965 | Nelson | F16D 65/847 |
| | | | | 188/264 AA |
| 3,251,437 | A * | 5/1966 | Moyer | F16D 55/40 |
| | | | | 188/264 AA |
| 3,482,654 | A * | 12/1969 | Abu-Akeel | F16D 55/40 |
| | | | | 192/70.16 |
| 3,664,467 | A * | 5/1972 | Lucien | F16D 65/847 |
| | | | | 188/71.6 |
| 3,977,631 | A * | 8/1976 | Jenny | F16D 55/40 |
| | | | | 244/50 |
| 3,983,974 | A * | 10/1976 | Dowell | F16D 65/847 |
| | | | | 188/71.6 |
| 4,140,198 | A * | 2/1979 | Chamberlain | B60K 17/046 |
| | | | | 180/370 |
| 4,431,091 | A * | 2/1984 | Scibbe | B60T 11/30 |
| | | | | 192/85.61 |
| 4,432,440 | A * | 2/1984 | Crossman | B60T 8/325 |
| | | | | 188/71.9 |
| 4,446,953 | A * | 5/1984 | Voss | F16H 57/0412 |
| | | | | 192/112 |
| 4,562,902 | A * | 1/1986 | Scibbe | B60T 1/062 |
| | | | | 91/416 |
| 6,241,052 | B1 * | 6/2001 | Berwanger | F16D 55/36 |
| | | | | 188/71.5 |
| 7,703,580 | B2 * | 4/2010 | Girod | B60T 8/325 |
| | | | | 188/73.1 |
| 7,900,752 | B2 * | 3/2011 | Mayberry | F16D 55/36 |
| | | | | 188/71.6 |
| 8,191,691 | B2 | 6/2012 | Gelb | |
| 8,527,161 | B2 * | 9/2013 | Baldwin | F16D 13/72 |
| | | | | 192/113.1 |
| 8,662,277 | B2 * | 3/2014 | Schoon | B60T 13/22 |
| | | | | 475/331 |
| 8,839,918 | B2 | 9/2014 | Thibault et al. | |
| 9,291,222 | B2 | 3/2016 | Hummel et al. | |
| 9,862,484 | B2 * | 1/2018 | Daffos | B64C 25/42 |
| 10,203,010 | B2 | 2/2019 | Gonzalez et al. | |
| 10,549,848 | B2 | 2/2020 | Klim et al. | |
| 2009/0265880 | A1 | 10/2009 | Jessberger | |
| 2010/0065387 | A1 | 3/2010 | Tsiberidis | |
| 2012/0067206 | A1 | 3/2012 | Lupica et al. | |
| 2015/0233467 | A1 * | 8/2015 | Noerenberg | F16H 57/10 |
| | | | | 192/221.1 |
| 2019/0301554 | A1 | 10/2019 | Hosamane et al. | |
| 2020/0063809 | A1 | 2/2020 | Cyrot | |
| 2020/0189729 | A1 | 6/2020 | Heid et al. | |
| 2020/0300321 | A1 * | 9/2020 | Cocks | F16D 65/186 |
| 2021/0001823 | A1 * | 1/2021 | Georgin | B60T 8/1703 |

FOREIGN PATENT DOCUMENTS

| | | |
|---|---|---|
| EP | 3 954 922 A1 | 2/2022 |
| RO | 132861 A1 | 10/2018 |
| WO | 1981002690 A1 | 10/1981 |
| WO | 2005091838 A2 | 10/2005 |

\* cited by examiner

BRAKE ASSEMBLY WITH CONTAINED BRAKE ENVIRONMENT

BACKGROUND

Magnetically levitated ("maglev") transportation systems, such as Hyperloop vehicles, provide the potential to move passengers and cargo at faster speeds and with improved efficiency compared to currently utilized modes of transportation. These systems employ vehicles that include one or more pressurized capsules to carry passengers and/or cargo through evacuated, i.e., low pressure, tubes. When traveling at high speeds, the vehicles are levitated by magnetic fields, compressed air, or other suitable means. By reducing/eliminating the high-speed air resistance and the friction inherent in the wheels of known vehicles, maglev systems are able to provide greater travel speeds and improved efficiency.

When traveling at low speeds or stopped, the vehicles do not levitate, but are instead supported by a support system that includes a plurality of independently controlled landing gear assemblies. Like aircraft landing gear, the maglev support systems reciprocate between an extended (deployed) position and retracted (stowed) position by extending and retracting the individual landing gear assemblies. When the vehicles are levitated, the support system is retracted, and the wheels of the landing gear assemblies do not contact the ground. When the vehicles are traveling at low speeds or stopped, the support system is extended so that the wheels of the landing gear assemblies contact a ground surface to support the vehicles.

FIG. 1 shows a representative embodiment of a known landing gear assembly 20 suitable for use as part of one or more of the independently actuated landing gear assemblies of a maglev vehicle. The landing gear assembly 20 is described in U.S. Pat. No. 10,549,848 ("Klim et al."), issued Feb. 4, 2020, and currently assigned to Safran Landing Systems Canada Inc., the disclosure of which is expressly incorporated herein.

The landing gear assembly 20 includes a wheel assembly 22 and a shock strut 38 that is extendable and retractable. The wheel assembly 22 is coupled to the shock strut 38, which selectively drives extension and retraction of the landing gear assembly 20. The wheel assembly 22 include a pair of wheels 24 rotatably mounted to an axle 32 that is positioned at one end of a trailing arm body 34. A pivot pin 36 is positioned at the other end of the trailing arm body 34 to rotatably couple the trailing arm body to the vehicle (not shown), such as an aircraft or a maglev vehicle.

The shock strut 38 includes a housing 40 pivotably mounted to the vehicle. A drive screw 42 extends through an aperture in the housing 40 and includes an external screw thread 44 that engages an internal screw thread formed in the aperture of the housing 40. A piston 48 extends from the drive screw 42 to operatively couple the drive screw 42 to the wheel assembly 22.

A motor 46 is mounted to the housing 40 and is operably coupled to the drive screw 42 to selectively rotate the drive screw about a longitudinal axis. The drive screw 42, housing 40, and motor 46 cooperate to function as an actuator 50 that extends and retracts the landing gear assembly 20. In this regard, the housing 40 functions as a ball nut so that selective rotation of the drive screw 42 by the motor 46 translates the drive screw and motor in an axial direction relative to the housing. This translation of the drive screw 42 rotates the wheel assembly 22 about its pivotal connection to the vehicle, thereby extending and retracting the landing gear assembly 20.

One or more of the wheels assemblies 22 shown in FIG. 1 includes a brake assembly to provide braking functionality when the landing gear assemblies 20 are extended and at least partially supporting the maglev vehicle. FIG. 2 shows an embodiment of a known brake assembly 60 suitable for use with the wheel assemblies 22 shown in FIG. 1. The brake assembly 60 is disclosed in U.S. Pat. No. 8,839,918, issued to Thibault et al., ("Thibault") and currently assigned to Safran Landing Systems, the disclosure of which is expressly incorporated herein.

Referring to FIG. 2, a portion of the wheel assembly 22 is shown. Each wheel 24 of the wheel assembly 22 includes a pneumatic tire 28 mounted to a rim 26. The rim 26 is mounted to the axle 32 by a plurality of bearings 30 so that the wheel 24 is rotatably about the centerline 80 of the axle 32.

The brake assembly 60 includes an annular bracket 70 fixedly coupled to the axle 32. The bracket 70 is configured to provide mounting interfaces for brake components that remain fixedly positioned relative to the axle 32. In some embodiments, several brackets are utilized to fixedly mount the brake components to the axle 32. In some embodiments, one or more brake components are fixedly mounted other landing gear components to maintain a fixed position relative to the axle 32.

The illustrated brake assembly 60 is a multi-disc brake assembly that includes a stack 64 of discs. More specifically, the stack 64 includes a series of alternating rotors 66 and stators 68. Each of the rotors 66 is keyed to the rim 26 of the wheel 24 so that the rotors rotate in unison with the wheel. Each of the stators 68 is keyed to the axle 32 and remains rotationally fixed relative to the axle. Thus, when the aircraft wheels 24 rotate, e.g., when the maglev vehicle is supported by the landing gear assembly 20 and the vehicle is in motion, the rotors 66 rotate with the wheels relative to the stators 68.

A plurality of actuators 62 are mounted to the bracket 70 and are spaced circumferentially around the axle 32. The actuators 62 are linear actuators that selectively extend and retract in unison. Extension of the actuators 62 clamps the stack 64 between the actuators and a torque plate 72 mounted to or integrally formed with the bracket 70 opposite the actuators. As the actuators 62 compress the stack 64, adjacent stators 68 and rotors 66 engage each other. With the stack 64 compressed and the rotors 66 rotating with the wheels 24, friction between the rotors 66 and the stators 68 generate a resistive braking force that is reacted to the wheels through the stators. When the actuator is retracted, the rotors 66 and stators 68 disengage from each other, and the restive braking force ceases.

Materials developed for use in conventional braking systems are generally designed for use in standard atmospheric operating conditions. Utilizing these materials in a low-pressure braking environment can affect performance and operational lifetime of a braking system. Further, known braking systems, such as those that employ friction braking, produce particulate matter (dust) from the abrasion of braking friction materials. Dust produced from braking within a confined space can cause contamination of the operational environment, which can negatively affect other equipment and systems within the operational environment.

SUMMARY

In accordance with an embodiment of the present disclosure, a brake assembly is provided. The brake assembly is suitable for use in conjunction with a wheel having a rim rotatably mounted to an axle. The brake assembly includes a brake stack and an actuation assembly that is configured to selectively apply a force to the brake stack. A cover sealingly engages with the rim of the wheel to at least partially define a fluidic barrier between a brake cavity and an ambient environment. The brake stack is disposed within the sealed brake cavity in fluidic isolation from the ambient environment.

In any embodiment, the actuation assembly is mounted to the cover.

In any embodiment, the cover is sealingly engaged with the axle.

In any embodiment, the brake assembly further comprises a brake control unit in fluid connection with the brake cavity.

In any embodiment, the brake control unit is configured to provide an input flow of gas to the brake cavity through an inlet formed in the cover.

In any embodiment, the brake control unit comprises a pump.

In any embodiment, the gas is an inert gas.

In any embodiment, the brake control unit is configured to receive an output flow of gas from the brake cavity through an outlet formed in the cover.

In any embodiment, the input flow of gas flows through a first conduit in fluid connection at a first end with the brake control unit, the first conduit being in fluid connection at a second end with the inlet formed in the cover.

In any embodiment, an output flow of gas flows from the brake cavity to the brake control unit through a second conduit in fluid connection at a first end with the brake control unit and at a second end with an outlet formed in the cover.

In any embodiment, the brake assembly further comprises a filter configured to remove particulate matter from the output flow of gas.

In any embodiment, the brake assembly further comprises a sensor disposed within the brake cavity, wherein the sensor is configured to sense at least one of a temperature, a pressure, and a humidity within the brake cavity, the sensor being configured to transmit a signal to the brake control unit corresponding to the sensed at least one of the temperature, the pressure, and the humidity.

In accordance with an embodiment of the present disclosure, a brake assembly is provided. The brake assembly is suitable for use in conjunction with a wheel having a rim rotatably mounted to an axle. The brake assembly includes a brake stack and an actuation assembly that is configured to selectively apply a force to the brake stack. The brake assembly further includes a sealed brake cavity in fluid isolation from the ambient environment. The brake cavity comprises a cover sealingly engaged with the rim to at least partially define a fluidic barrier between the brake cavity and the ambient environment. The brake stack is disposed within the brake cavity.

In any embodiment, the brake assembly further comprises a ventilation assembly in fluid communication with the brake cavity, the ventilation assembly being configured to provide a flow of gas through the brake cavity.

In any embodiment, the ventilation assembly comprises a filter configured to remove particulate matter from the flow of gas.

In any embodiment, the ventilation assembly comprises a sensor configured to sense a temperature within the brake cavity, the ventilation assembly controlling the flow of gas at least in part in response to the sensed temperature.

In any embodiment, the ventilation assembly comprises a sensor configured to sense a humidity within the brake cavity, the ventilation assembly controlling the flow of gas at least in part in response to the sensed humidity.

In any embodiment, the ventilation assembly comprises a filter configured to remove particulate matter from the flow of gas.

In any embodiment, the ventilation assembly further comprises a sensor configured to sense a pressure within the brake cavity, the ventilation generating a signal to service the filter in response to the sensed pressure exceeding a predetermined maximum threshold.

In any embodiment, the ventilation assembly generates a signal to perform a ventilation assembly check in response to the sensed pressure dropping below a predetermined minimum threshold.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of the disclosed subject matter will become more readily appreciated as the same become better understood by reference to the following detailed description, when taken in conjunction with the accompanying drawings, wherein.

DETAILED DESCRIPTION

Embodiments of a sealed brake assembly are provided. The brake assemblies are suitable for use with maglev vehicles or other applications in which it is advantageous to isolate the brake assembly environment from the operating (ambient) environment. The described brake assemblies may include a ventilation assembly that purges particulate matter and other contaminates from the brake assembly environment. The ventilation assembly also provides control of various conditions within the brake assembly environment in order to improve performance and reduce wear of brake assembly components.

Figure 1:
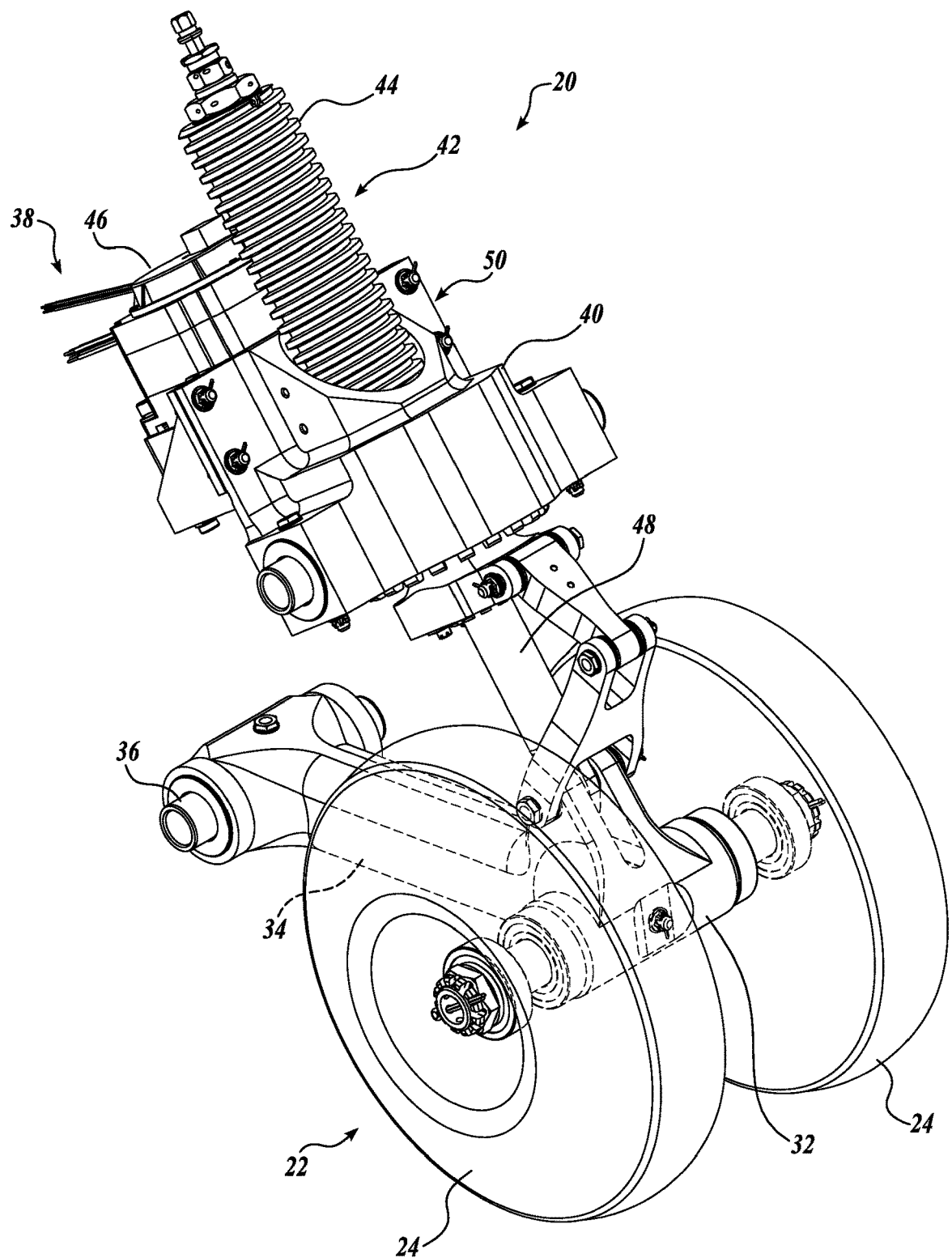
FIG. 1 shows an isometric view of a known landing gear assembly.
Figure 2:
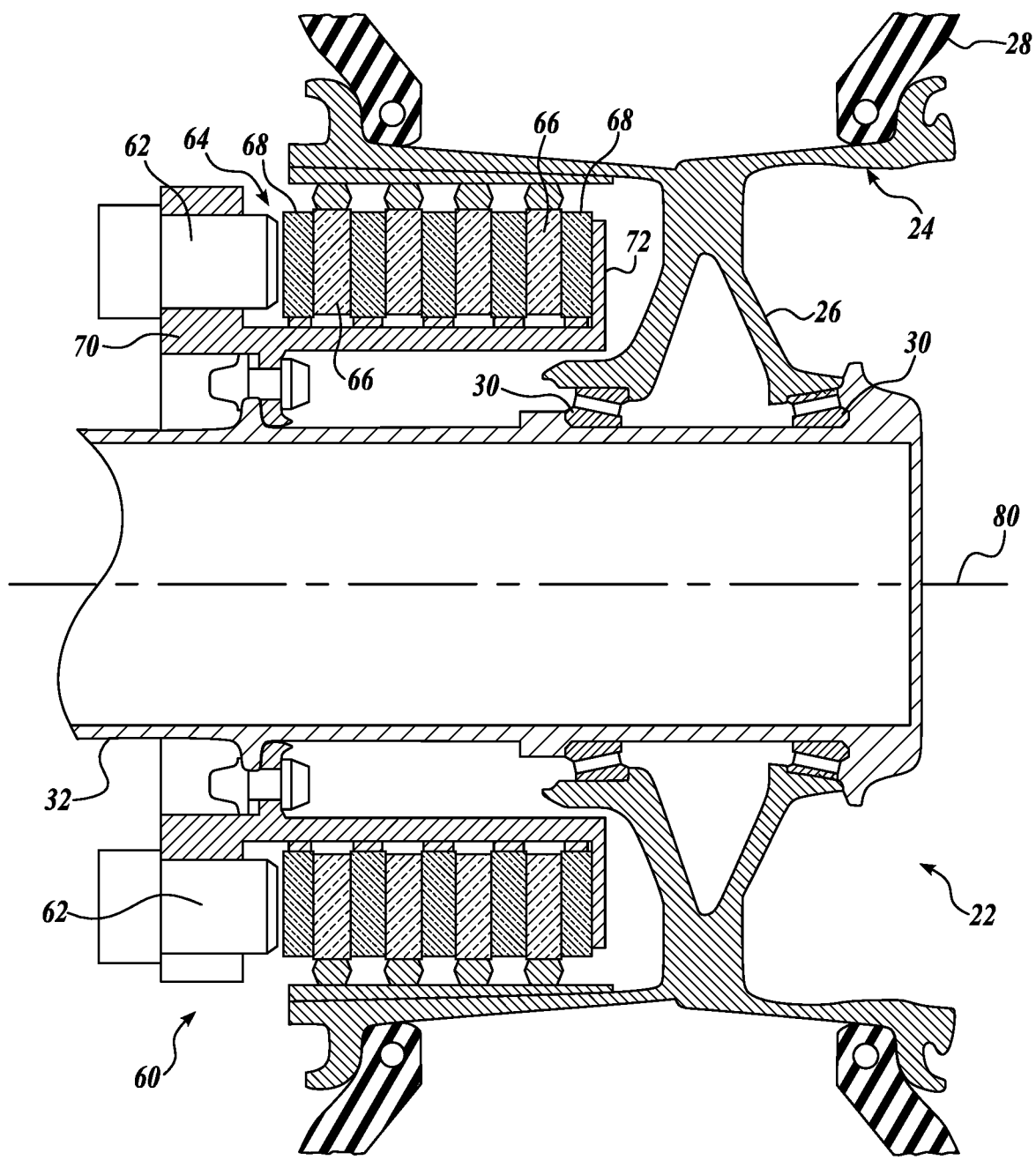
FIG. 2 shows a cross sectional view of a known brake assembly suitable for use with the landing gear assembly of FIG. 1.
Figure 3:
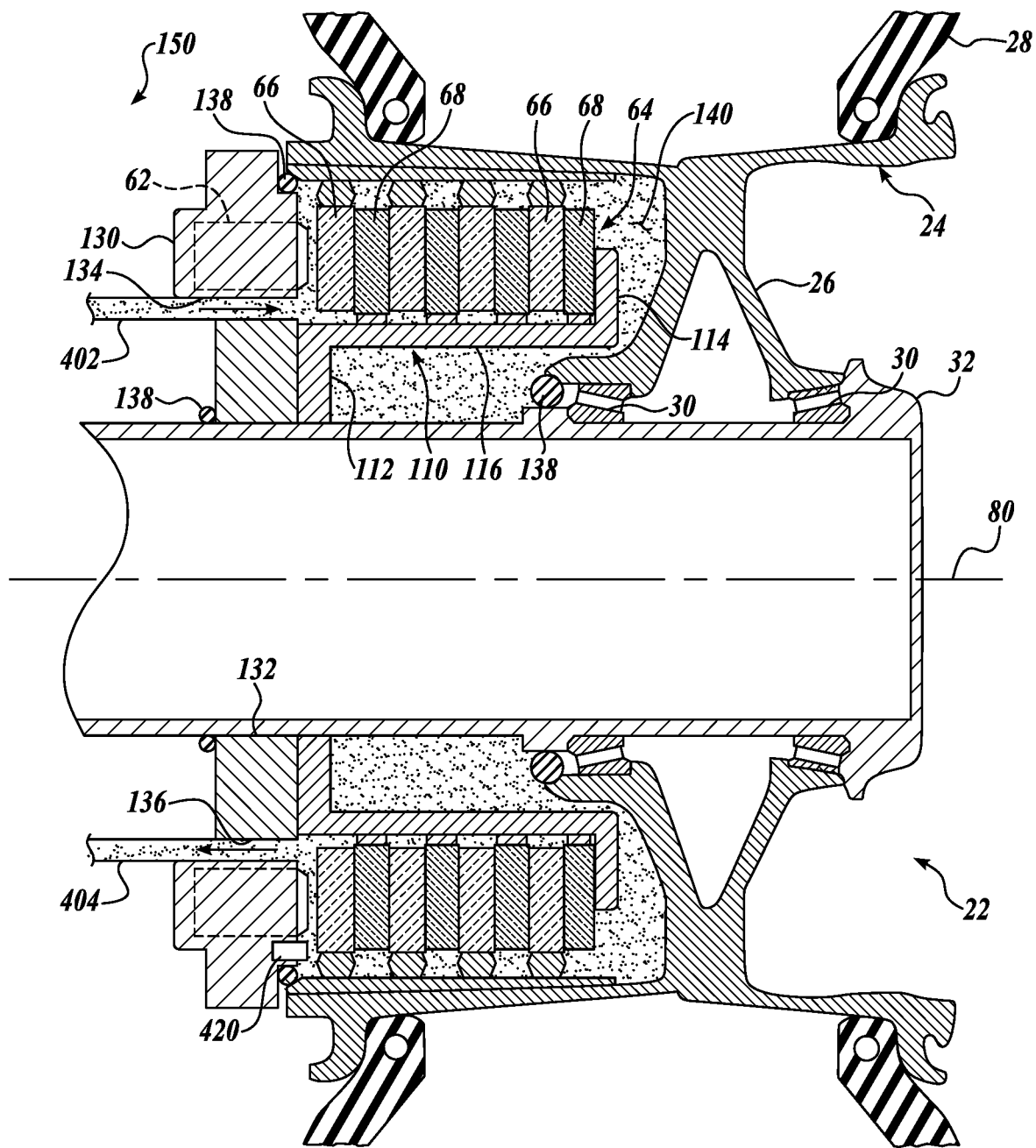
FIG. 3 shows cross-sectional view of a brake assembly according to a first representative embodiment of the present disclosure, wherein the brake assembly is suitable for use with the landing gear assembly of FIG. 1.
Figure 4:
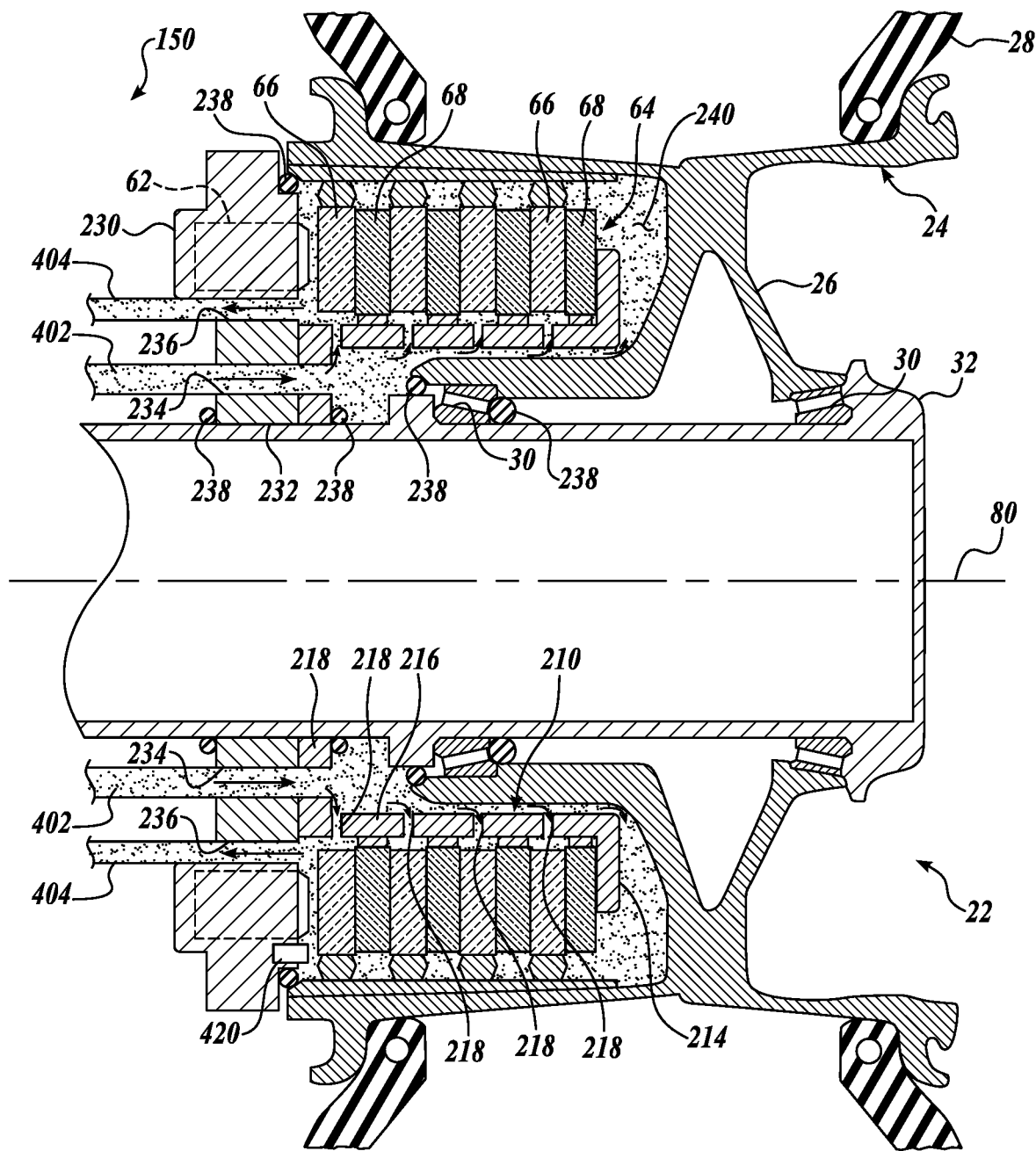
FIG. 4 shows cross-sectional view of a brake assembly according to a second representative embodiment of the present disclosure, wherein the brake assembly is suitable for use with the landing gear assembly of FIG. 1.
Figure 5:
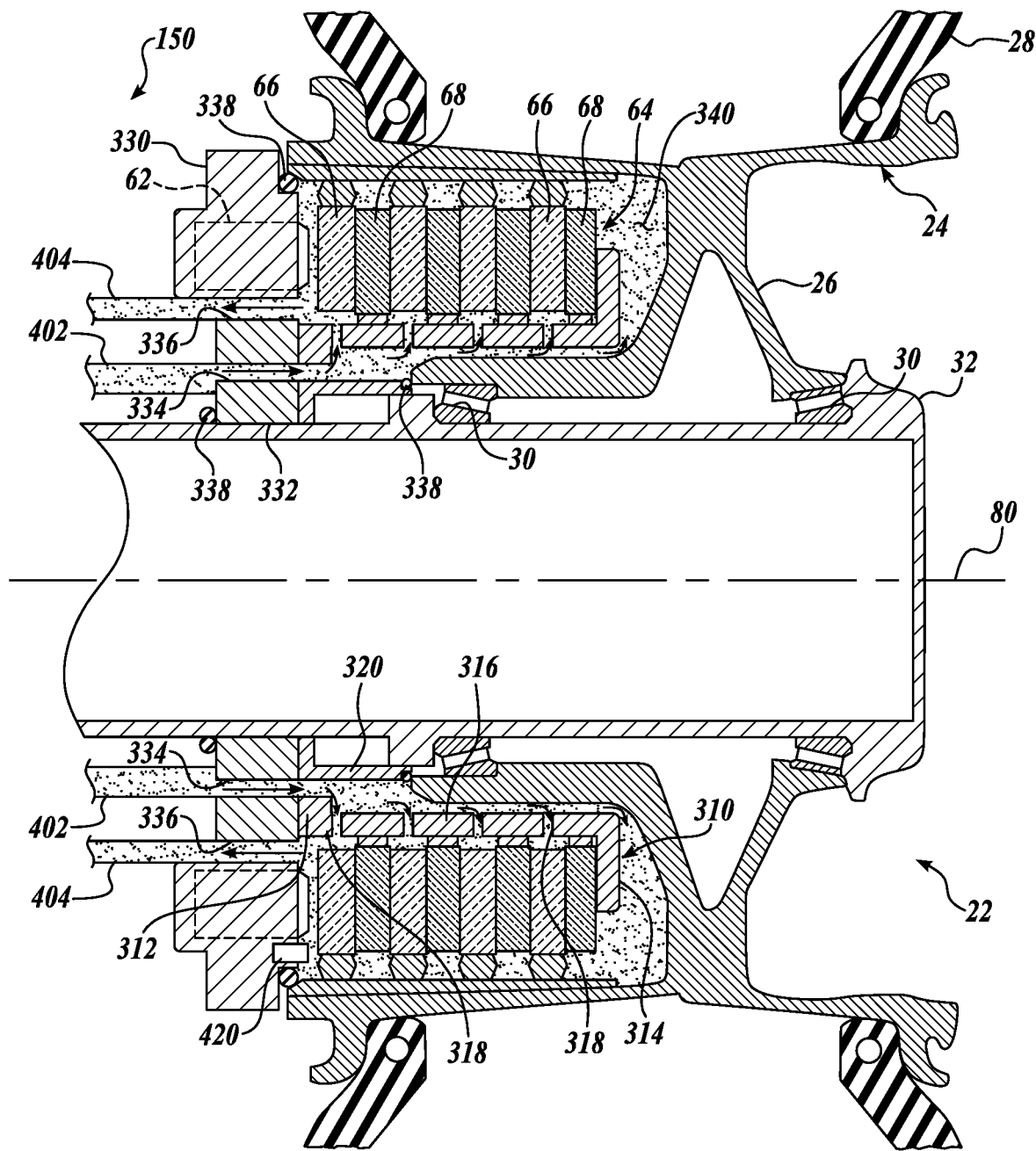
FIG. 5 shows cross-sectional view of a brake assembly according to a third representative embodiment of the present disclosure, wherein the brake assembly is suitable for use with the landing gear assembly of FIG. 1.

FIGS. 3-5 show various representative embodiments of brake assemblies according to the present disclosure. The brake assemblies are shown in conjunction with a wheel assembly 22 and an axle 32 similar to those shown in FIG. 2. To avoid repetition, descriptions of the various brake assembly embodiments are made with the understanding that unless otherwise noted, the wheel assembly 22, axle 32, actuators 62, and brake stack 64 (including rotors 66 and stators 68) are as described with reference to FIG. 2.

Referring now to FIG. 3, a first representative embodiment of a brake assembly 100 is shown. The brake assembly 100 includes a bracket 110 fixedly positioned relative to the axle 32. In the illustrated embodiment, the bracket 110 has an annular shape that includes a central aperture 132 through which the axle 32 extends. The bracket 110 has a Z-shaped cross section with a first end 112 that extends radially inward and is coupled to the axle 32. A second end 114 of the bracket 110 extends radially outward and acts as a torque plate that reacts actuating forces applied to the brake stack 64. A central portion 116 of the bracket 110 extends parallel to the axis 80 of the axle 32. The central portion 116 engages the stators 68 of the brake stack 64 and fixes the stators in rotation relative to the axle 32.

An annular cover 130 extends around the axle 32 and is fixedly coupled to the first end 112 of the bracket. A plurality of brake actuators 62 is mounted to the cover and positioned such that extension of the actuators compresses the brake stack 64 against the second end 114 of the bracket 110 to provide a resistive braking force.

An annular seal 138, such as labyrinth seal, is disposed between the cover 130 and the rim 26 of the wheel 24 to provide sealing engagement between the cover and the rim. Similarly, an annular seal 138 engages the cover 130 and the axle 32 to provide a sealed interface therebetween. Another annular seal 138 provides a sealed interface between the axle 32 and the rim 26 of the wheel 24 so that the axle 32, the rim 26, and the cover 130 cooperate to define a sealed brake cavity 140 in which the brake stack 164 is located. In this regard, the brake cavity 140 and the components contained therein are in fluidic isolation from the ambient environment 150 of the landing gear assembly 20. It will be appreciated that the number, type, and location of the seals is exemplary only, and any suitable sealing configuration may be used to provide a sealed brake cavity 140.

At least one inlet aperture 134 and at least one outlet aperture 136 are formed in the cover 130. The inlet and outlet apertures 134 and 136 are in fluid connection with an inlet conduit 402 and an outlet conduit 404, respectively.

Figure 6:
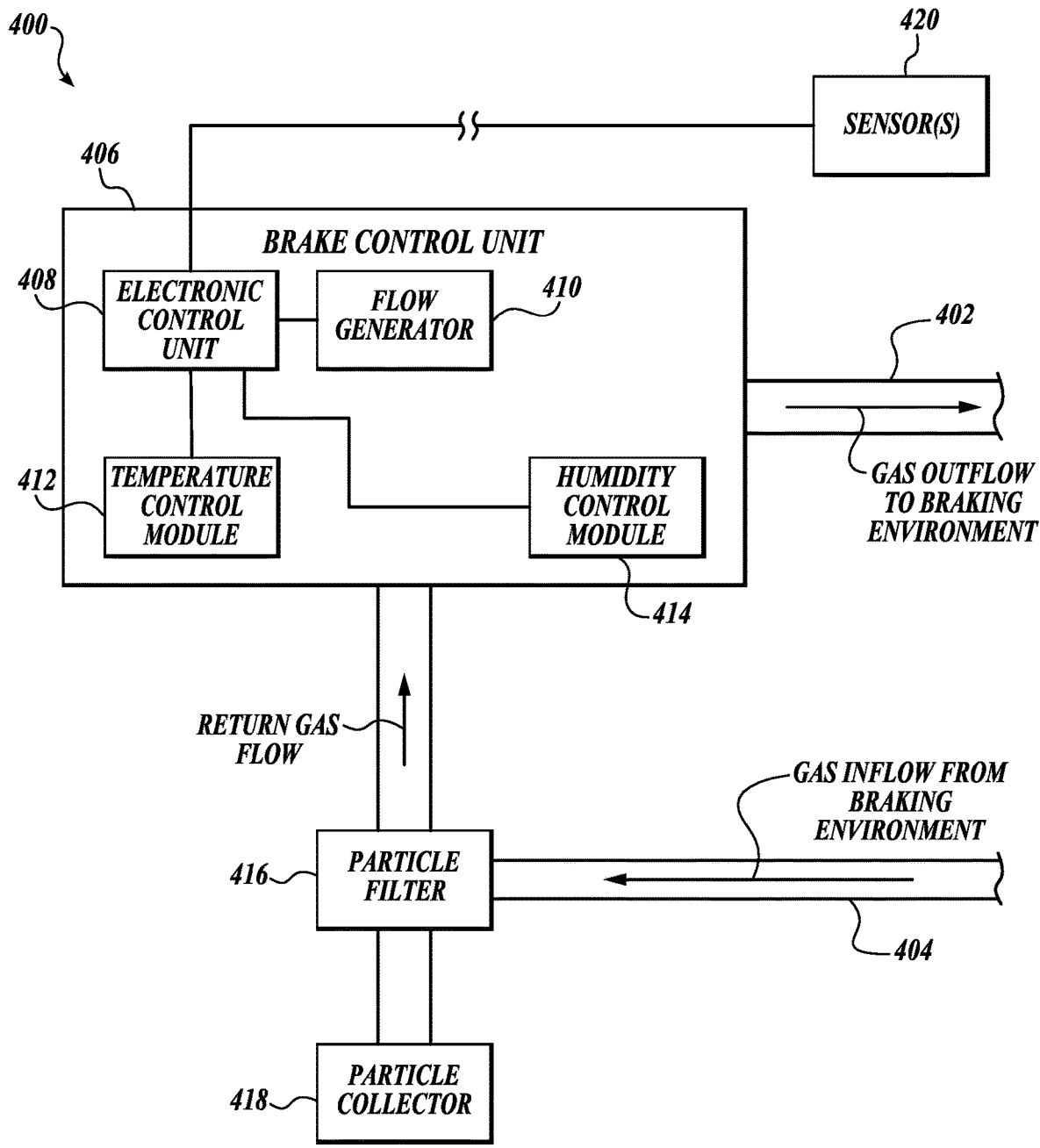
FIG. 6 shows a schematic diagram of a representative embodiment of a ventilation assembly suitable for use with any of the brake assemblies of FIGS. 3-5.

Referring now to FIG. 6, the brake assembly 100 includes a ventilation system 400 configured to monitor and control the environment within the sealed brake cavity 140. The ventilation system 400 includes a brake control unit 406 operatively coupled to various components of the brake assembly. The brake control unit 406 includes an electronic control unit (ECU) 408 communicatively coupled to a number of components of the brake assembly 100 to control various aspects of the brake assembly operation. In some embodiments, the ECU 408 includes a processor and memory. The memory may include computer readable storage media in read-only memory (ROM), random-access memory (RAM), and keep-alive memory (KAM), for example. The KAM may be used to store various operating variables or program instructions while the processor is powered down. The computer-readable storage media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, instructions, programs, modules, etc.

As used herein, the term processor is not limited to integrated circuits referred to in the art as a computer, but broadly refers to a microcontroller, a microcomputer, a microprocessor, a programmable logic controller, an application specific integrated circuit, other programmable circuits, combinations of the above, among others. Therefore, as used herein, the term "processor" can be used to generally describe these aforementioned components, and can be either hardware or software, or combinations thereof, that implement logic for carrying out various aspects of the present disclosure. Similarly, the terms "module" and "unit" can include logic that may be implemented in either hardware or software, or combinations thereof.

The brake control unit includes a flow generator 410, such as a pump, in fluid communication with the brake cavity 140 through the inlet conduit 402 and the outlet conduit 404. The flow generator 410 provides a flow of gas to the brake cavity 140 through the inlet conduit 402. In some embodiments, the gas is an inert gas, such as argon or nitrogen, to prevent oxidation of the brake system components. In some embodiments, the gas has a high thermal capacity to provide improved cooling of the brake system components. In some embodiments, the gas is chosen based on the brake component materials to maintain or improve performance of the brake system.

Gas is returned from the brake cavity 140 to the flow generator 410 of the brake control unit 406 through the outlet conduit 404. An inline particle filter 416 filters particulate matter, such as brake dust, out of the returning gas before the gas reaches the brake control unit 406. The particulate matter is collected in a particle collector 418 that may be replaced or serviced as needed.

As shown in FIGS. 3 and 6, the brake assembly 100 includes one or more sensor(s) 420. These sensor(s) 420 may include brake assembly state sensors capable of generating values that represent states including, but not limited to, the temperature of various brake assembly components, including the gas within the brake cavity 140. The sensors(s) 420 may also generate signals corresponding to the pressure and/or humidity of the gas inside the brake cavity 140. The sensor(s) 420 are communicatively coupled to the ECU 408, and values generated by the sensor(s) 420 may be transmitted to the ECU. It will be appreciated that the number, type and location of the sensor(s) may vary from the disclosed embodiment. In this regard, the sensor(s) may be placed in any suitable location for sensing particular conditions within the brake system.

In some embodiments, additional copies of the ECU 408, and/or other components may be provided for redundancy. Further, the components of brake assembly 100 may be communicatively coupled via any suitable communication technique, including but not limited to serial wired communication, wireless communication (via Bluetooth, Wi-Fi, or other wireless communication techniques), and/or networked wired communication (via USB, Ethernet, CANBUS, or other wired communication techniques).

In some embodiments, the brake control unit 406 includes a temperature control module 412 communicatively coupled to the ECU 408. The ECU 408 receives signals from a sensor 420 indicating a sensed temperature within the brake cavity 140 and may signal the temperature control module 412 to control the temperature of the gas supplied to the brake cavity 140 improve brake performance. In some embodiments, when a sensed temperature exceeds a predetermined threshold, the ventilation system 400 provides a flow of gas (or increases an existing flow) to the brake cavity 140 to cool the brake stack 64, thereby improving performance and decreasing wear of the brake components.

Similarly, in some embodiments the brake control unit 406 includes a humidity control module 414 communicatively coupled to the ECU 408. The ECU 408 receives signals from a sensor 420 indicating a sensed humidity within the brake cavity 140 and may signal the humidity control module 414 to control the humidity of the gas supplied to the brake cavity 140 to improve brake performance and longevity.

In some embodiments, a sensor 420 senses a pressure within the brake cavity 140 and sends a corresponding signal to the ECU 408. In some embodiments, when the sensed pressure exceeds a predetermined maximum threshold value, the ECU 408 may generate a signal indicating that the particle filter 416 should be serviced, as increase pressure may result from a clogged filter. In some embodiments, when the sensed pressure is below a predetermined minimum threshold value, the ECU 408 may generate a signal that the brake system should be checked for a possible leak.

Still referring to FIGS. 3 and 6, the disclosed brake assembly 100 isolates the brake assembly components from the ambient environment. In embodiments utilized on maglev vehicles, the brake assembly 100 prevents particulate matter produced by braking operations from contaminating the low-pressure environments in which the vehicles operate. In other embodiments, such as brakes used on lunar rovers, the brake assembly 100 isolates the brake components from environmental contaminates that could cause undue wear or premature failure of the brake components. The disclosed brake assembly 100 also provides a controlled environment for the brake components, and in particular, the brake stack. By controlling the temperature, humidity pressure, and any other suitable operating conditions or combinations of conditions, brake performance and longevity can be improved.

In operation, the ventilation system 400 provides a flow of gas to the brake cavity 140. More specifically, the brake control unit 406 controls the flow generator 410 to provide a flow of gas to the brake cavity 140 through the inlet aperture 134 of the cover 130. The gas flows through the brake cavity 140 and then returns to the brake control unit 406 through the outlet aperture 136. As the gas flows through the brake cavity 140, the gas impinges on the rotors 66 and stators 68 to cool the brake components. The flow of gas through the brake cavity 140 also purges the brake cavity of particulate matter and collects the particulate matter to ensure that the ambient environment 150 is not contaminated. In some embodiments, the gas flow also allows for additional temperature and/or humidity control within the brake cavity 140.

Referring now to FIG. 4, another embodiment of a brake assembly 200 will be described. The brake assembly 200 is similar to the brake assembly 100 of FIG. 3, wherein components of the brake assembly 200 designated with a reference number 2XX correspond to components of the brake assembly 100 designated with a reference number 1XX. The brake assembly 200 will be described with the understanding that components of the brake assembly 200 are similar to the corresponding components of the previously described brake assembly 100 except as otherwise noted.

The cover 230 of brake assembly 200 includes a plurality of inlet apertures 134 and outlet apertures 136, wherein the outlet apertures are positioned radially outward of the inlet apertures. The middle portion 216 of the bracket 210 includes a plurality of apertures 218 extending radially therethrough. The illustrated configuration directs gas flow from a radially inward portion of the brake cavity 240, outward through the apertures 218 in the bracket 210, between the stators 68 and rotors 66, and then out through the outlet apertures 236. In this manner, the disclosed configuration provides more direct flow of gas over the stators 68 and rotors 66, which results in greater cooling of the brake components and a more thorough purging of particulate matter within the brake cavity 240.

In order to seal the brake cavity 240, seals 238 are positioned between the rim 26 and the cover 230, between the axle 32 and the cover 230, between the axle 32 and the bracket 210, and on both sides of the inboard roller bearing 30 between the rim 26 and the axle 32. It will be appreciated that the number and location of seals 238 in this and other disclosed embodiments is exemplary only. Other embodiments using seals of different numbers, types, and positions to seal the brake cavity 240 are possible and should be considered within the scope of the present disclosure.

Referring now to FIG. 5, another embodiment of a brake assembly 300 will be described. The brake assembly 300 is similar to the brake assembly 200 of FIG. 4, wherein components of the brake assembly 300 designated with a reference number 3XX correspond to components of the brake assembly 200 designated with a reference number 2XX. The brake assembly 300 will be described with the understanding that components of the brake assembly 300 are similar to the corresponding components of the previously described brake assembly 200 except as otherwise noted.

In the illustrated embodiment, the first end 312 of the bracket 310 includes a return flange 320 that extends in an outboard direction. The return flange 320 sealingly engages the rim 26 with a seal 338. The brake assembly 300 further includes seals 338 positioned between the rim 26 and the cover 330 and between the axle 32 and the cover 330. Thus, the illustrated embodiment may utilize fewer seals than other contemplated embodiments.

It will be appreciated that the disclosed embodiments are exemplary only and should not be considered limiting. In some embodiments, various configurations are employed to provide a sealed brake cavity. Further, the present disclosure is not limited to a particular type of brake configuration. In some embodiments, different brake actuators, brake stack configurations, and/or other brake components may be utilized. These and other variations are contemplated and should be considered within the scope of the present disclosure.

The present application may reference quantities and numbers. Unless specifically stated, such quantities and numbers are not to be considered restrictive, but exemplary of the possible quantities or numbers associated with the present application. Also, in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A, B, and C," for example, means (A), (B), (C), (A and B), (A and C), (B and C), or (A, B, and C), including all further possible permutations when greater than three elements are listed.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A landing gear assembly, comprising:
   an axle;
   a wheel comprising a rim rotatably mounted to the axle;
   an annular cover fixed in rotation relative to the axle, wherein an outer radial portion of the cover is sealingly engaged with the rim to define a fluidic barrier that isolates a brake cavity from an ambient environment; and
   a brake assembly, comprising:
      a brake stack disposed within the brake cavity; and
      an actuation assembly configured to selectively apply a force to the brake stack.

2. The landing gear assembly of claim 1, wherein the actuation assembly is mounted to the cover.

3. The landing gear assembly of claim 1, wherein the cover is sealingly engaged with the axle.

4. The landing gear assembly of claim 1, further comprising a brake control unit in fluid connection with the brake cavity.

5. The landing gear assembly of claim 4, wherein the brake control unit is configured to provide an input flow of gas to the brake cavity through an inlet formed in the cover.

6. The landing gear assembly of claim 5, wherein the brake control unit comprises a pump.

7. The landing gear assembly of claim 5, wherein the gas is an inert gas.

8. The landing gear assembly of claim 5, wherein the brake control unit is configured to receive an output flow of gas from the brake cavity through an outlet formed in the cover.

9. The landing gear assembly of claim 5, wherein the input flow of gas flows through a first conduit in fluid connection at a first end with the brake control unit, the first conduit being in fluid connection at a second end with the inlet formed in the cover.

10. The landing gear assembly of claim 9, wherein an output flow of gas flows from the brake cavity to the brake control unit through a second conduit in fluid connection at a first end with the brake control unit and at a second end with an outlet formed in the cover.

11. The landing gear assembly of claim 10, further comprising a filter configured to remove particulate matter from the output flow of gas.

12. The landing gear assembly of claim 5, further comprising a sensor disposed within the brake cavity, wherein the sensor is configured to sense at least one of a temperature, a pressure, and a humidity within the brake cavity, the sensor being configured to transmit a signal to the brake control unit corresponding to the sensed at least one of the temperature, the pressure, and the humidity.

13. A brake assembly for a wheel in an ambient environment, the wheel comprising a rim rotatably mounted to an axle, the brake assembly comprising:
   a brake stack;
   an actuation assembly configured to selectively apply a force to the brake stack;
   a sealed brake cavity in fluid isolation from the ambient environment, the brake cavity comprising a cover sealingly engaged with the rim to at least partially define a fluidic barrier that isolates the brake cavity from the ambient environment, wherein the brake stack is disposed within the brake cavity; and
   a ventilation assembly in fluid communication with the brake cavity, the ventilation assembly being configured to provide a flow of gas through the brake cavity and comprising a filter configured to remove particulate matter from the flow of gas and a sensor configured to sense a pressure within the brake cavity, the ventilation assembly generating a signal to service the filter in response to the sensed pressure exceeding a predetermined maximum threshold, wherein the ventilation assembly generates a signal to perform a ventilation assembly check in response to the sensed pressure dropping below a predetermined minimum threshold.

14. The brake assembly of claim 13, wherein the ventilation assembly comprises a sensor configured to sense a temperature within the brake cavity, the ventilation assembly controlling the flow of gas at least in part in response to the sensed temperature.

15. The brake assembly of claim 13, wherein the ventilation assembly comprises a sensor configured to sense a humidity within the brake cavity, the ventilation assembly controlling the flow of gas at least in part in response to the sensed humidity.

* * * * *